US008864583B1

(12) United States Patent
Lotzer

(10) Patent No.: US 8,864,583 B1
(45) Date of Patent: Oct. 21, 2014

(54) COMPUTING DEVICE INDEPENDENT AND TRANSFERABLE GAME LEVEL DESIGN AND OTHER OBJECTS

(75) Inventor: Carey Leigh Lotzer, Sachse, TX (US)

(73) Assignee: Open Invention Network, LLC, Durham, NC (US)

( * ) Notice: Subject to any disclaimer, the term of this patent is extended or adjusted under 35 U.S.C. 154(b) by 200 days.

(21) Appl. No.: 13/463,615

(22) Filed: May 3, 2012

Related U.S. Application Data

(60) Provisional application No. 61/481,844, filed on May 3, 2011.

(51) Int. Cl.
  *A63F 13/00* (2014.01)
  *A63F 13/12* (2006.01)
  *G06F 19/00* (2011.01)

(52) U.S. Cl.
  USPC .................. 463/31; 463/24; 463/29; 463/42; 345/427

(58) Field of Classification Search
  USPC ........................ 463/24, 29, 31, 42; 345/427
  See application file for complete search history.

(56) References Cited

U.S. PATENT DOCUMENTS

| | | | | |
|---|---|---|---|---|
| 4,858,930 | A * | 8/1989 | Sato | 463/23 |
| 7,156,733 | B2 * | 1/2007 | Chiang et al. | 463/1 |
| 7,444,583 | B2 * | 10/2008 | Aronson et al. | 715/200 |
| 7,765,539 | B1 * | 7/2010 | Elliott et al. | 717/168 |
| 8,147,339 | B1 * | 4/2012 | Perry | 463/42 |
| 8,368,695 | B2 * | 2/2013 | Howell et al. | 345/427 |
| 2003/0064805 | A1 * | 4/2003 | Wells | 463/39 |
| 2003/0154446 | A1 * | 8/2003 | Constant et al. | 715/531 |
| 2003/0211890 | A1 * | 11/2003 | Gendo et al. | 463/43 |
| 2004/0121837 | A1 * | 6/2004 | Chiang et al. | 463/24 |
| 2004/0204230 | A1 * | 10/2004 | Kazama et al. | 463/24 |
| 2005/0261062 | A1 * | 11/2005 | Lewin et al. | 463/42 |
| 2006/0030408 | A1 * | 2/2006 | Kiiskinen | 463/42 |
| 2006/0148571 | A1 * | 7/2006 | Hossack et al. | 463/43 |
| 2007/0021216 | A1 * | 1/2007 | Guruparan | 463/43 |
| 2008/0192053 | A1 * | 8/2008 | Howell et al. | 345/427 |
| 2009/0233705 | A1 * | 9/2009 | LeMay et al. | 463/25 |
| 2009/0238405 | A1 * | 9/2009 | Buznach | 382/103 |
| 2012/0252582 | A1 * | 10/2012 | Hilleman | 463/43 |
| 2013/0047098 | A1 * | 2/2013 | Shuster et al. | 715/757 |
| 2013/0303244 | A1 * | 11/2013 | Jensen et al. | 463/1 |

* cited by examiner

*Primary Examiner* — William H McCulloch, Jr.
(74) *Attorney, Agent, or Firm* — Haynes and Boone, LLP

(57) ABSTRACT

A system which employs a method of creating transferable map schemas, storing the map schemas to storage devices, receiving target device settings, re-sampling the map schemas to fit the target devices using the target device settings, delivering the re-sampled map schemas to the target devices is described. Thereby providing the innovation that map schemas may be accessed by more than one type of device, the method by which maps are scaled from a created map dimension with given details to either a larger map having the ability to be utilized on a more capable playing device or to a map or a smaller map having the ability to be utilized on a less capable device without losing the important game-specific required data is also described.

20 Claims, 16 Drawing Sheets

COMPUTING DEVICE INDEPENDENT AND TRANSFERABLE GAME LEVEL DESIGN AND OTHER OBJECTS

CROSS-REFERENCE TO RELATED APPLICATIONS

The present patent application is related to and claims the benefit of U.S. provisional patent application 61/481,844, filed on May 3, 2011, entitled "COMPUTING DEVICE INDEPENDENT AND TRANSFERABLE GAME LEVEL DESIGN AND OTHER OBJECTS", the entire contents of which are hereby incorporated by reference.

BACKGROUND OF THE INVENTION

Overview

The present invention is generally related to game level design, game progress transfer and the transfer and staging of other data from one or more devices to another one or more devices so that progress is not only synchronized, but the points of progress, savepoints, related to the given one or more applications are identified, saved, transferred and recovered.

Several game software titles provide the ability to build maps, or levels as well as characters and other objects, in which one or more characters can exist, use or interact with. Several game titles also support the ability to save checkpoints and game progress. However the development of a map or other object is done using a controller, mouse, voice recognition, or other device or method and is developed for the purpose of working with given game software on a particular game system type and is not supported for moving the map, object, etc. to another device. Likewise, game statistics, checkpoints and game saves are not designed to be transferred from one device to another. In addition, non-game related data may be synchronized from one device or application to another, but the point in the application is not resumed from one device to another.

For example, there are several games which allow extending the game levels using maps that are built using the console controller for that type of console in which it is played or are downloaded to that console which were built on another console of the same type. Mapping data are transferable to other systems as long as the receiving system is the same as the system the map was created on or for.

Game developers—not after-market map artists or game players—may have the software and ability to develop game art including scenes and maps on systems such as a computer for a particular game system like a console, but these are not interchangeable maps made generally by other game players considered as part of the instant invention.

Maps are used primarily to not only extend one's own game but to also share with others so that they can play one or more games on the same map. Map developers may also provide the ability for other users to edit their maps for further extension and variety or to copy to create a new map or world.

The way a map is made is through creating a multidimensional scene, including landscape, buildings, planets, vehicles, etc. usually using a computer or console and then uploaded to a server.

For example, to create a map using a landscape, the user, usually has a landscape palette which allows them to select a set of one or more trees, rocks, grass, hills, valleys, vegetation, rivers, falls, ground elements, etc. Once the user selects the object with their mouse, controller, or through voice recognition or other device or method, they can drag or move the selected object onto their scene and it is then painted on the scene based on where the user placed it. At this point the user may be able to rotate the object, change its shape and/or dimensions, and lock it onto the scene when they are satisfied with it. Once the position, orientation and size of this element have been fixed, the user may select another item to place on their scene. Once the scene has been finished, they may have the ability to further modify the number of vehicles, the number of opponents, the number of towns, etc. that come with the map, and whether or not the player can add more before or during the progress of the game.

Once an item has been placed on the workspace, it may appear illuminated so that it shows the user that the object is still selectable and modifiable. The object illumination may show the number of pixels or quadrants that the object requires for its placement space. It may also appear in a red outline, which may represent that the object cannot be placed on the scene at the current location because it interferes with the location of another object or that the object does not belong in that place, such as a tree in an oceanic workspace location.

For example, a tree on a 1024×768 may occupy a 10×10 pixel area. In this case, the tree may appear as a transparent picture of a tree having a 10×10 pixel area with a projected placement locator having the same pixel area appearing below the tree. Once the tree is placed on the workspace, the projection disappears and the tree changes from a transparent object into an opaque object and the available workspace has not been reduced by a 100-pixel area.

The one or more objects on the workspace may also be selected and modified after they have been placed. The user would do this by selecting the one or more objects on the workspace and moving the mouse, controller, or through voice recognition or other method to a new location where they want to place the one or more objects. Likewise, the one or more objects may be deleted or changed in dimension.

Once the scene has been created and saved, it can be uploaded, for example, to a server and downloaded by someone else, installed, and played. This is one of many ways in which a map may be shared among people. The one or more maps created by an individual can be further exchanged for monetary or notoriety reasons and may also be traded for other maps made by other developers.

However, there is no facility to create or modify a map on a console, a computing device, or a mobile communication device which scales and can be transferred between the different devices. Maps must be designed and build for the unit type they are targeted to be played on.

The instant invention translates the scale and detail of the map developed either on a console, a mobile communication unit, or another computing device and facilitates the exchange of map data to/from either another console unit, another mobile communication device, or another computing device over a local or remote wireless or wired connection or other communication method.

In addition, a checkpoint or game save is generally game-specific. It is usually comprised of one or more files which contain data related to the one or more players' position on a map, the objects they may have in their inventory, the game score, game progress, as well as other items related to the game, the status of the players' avatars, etc. These one or more files are generally stored to a hard disk, flash drive, or other device on a console, handheld or other mobile device. However, the files are not designed to be transferred to another device, especially a device which may have a different operating system, file structure or system capabilities.

SUMMARY OF THE INVENTION

The instant invention employs a method of creating one or more map schemas, receiving one or more map schemas from the system the one or more map schemas were created on onto one or more storage devices, storing the one or more map schemas to one or more storage devices, receiving one or more target device settings, re-sampling the one or more map schemas to fit the one or more target devices using the one or more target device settings, delivering the one or more re-sampled map schemas to the one or more target devices.

In addition, the instant invention is related to creating one or more object savepoints, receiving one or more object savepoints on one or more first devices, storing the one or more object savepoints on one or more first devices, receiving the one or more object savepoints by one or more second devices, associating the one or more transferred savepoints to none, one or more applications, and setting the one or more applications' data and current progress to the one or more savepoints as they were established on the one or more first devices. For purposes of this invention, "object" means any attribute of the game, such as one or more players, items the players' avatars may have in their possessions, the players' health numbers, the players' scores, the locations the players' may be in the game layouts, the players' clothing items, and can also be related to other data including application data such as a spreadsheet, document, etc.

Creating a map schema requires the ability to create a layout for objects on a workspace. A workspace may have access to one or more objects or groups of objects which can be dragged, copied, etc. from the object palette to the workspace. Once the objects have been placed on the workspace, they may be modified. Modifications may include changing the object shape, dimensions, position, orientation, color, shading, inclination, etc. One or more objects may also be deleted from the workspace.

Once the workspace has been completed, the workspace may be saved to one or more storage devices. The stored workspace may be retrieved from one or more storage devices and modified further as the creator desires. Once the workspace has been modified, it may be stored again to one or more storage devices. The workspace may be further stored to one or more servers or other computing devices which allow receiving computing devices to query and download the stored workspaces so that they may be used on the one or more devices or further transferred from these one or more devices to one or more other devices. At the point at which a workspace has been saved and has the objects saved to it the creator desires, it can be considered a map. A map may have one or more levels.

Once a target device intends to receive one or more maps from a storage device, the target device must connect to the storage device, send map related settings to the storage device, the storage device, receiving the map related settings, will re-sample the desired one or more maps based on the target device map related settings, the storage device then may transfer the re-sampled map data to the target device.

The process of re-sampling the map data requires at least two capabilities. These capabilities may be enabled using one or more algorithms which may be selected programmatically or by a user based on the complexity of the map information or for other reasons. The two basic capabilities necessary are sample reduction or sample enlargement.

Sample reduction provides the ability to modify the map from an existing size to a reduced size used to play, for example, on smaller devices with less capabilities, smaller screens, etc.

Sample enlargement provides the ability to modify the map from an existing size to an enlarged size used to play, for example, on larger devices having more capabilities and/or larger screens.

Therefore, the instant invention provides the ability to offer the map creator the flexibility to create a map on one device and offer it to be used on other devices which are not the same as the authoring device.

For example, a map author may create a map on a mobile communication device and then provide the same map, using the sample enlargement aspect of the instant invention, so that the map can be enabled and played on a more capable device. In this manner, the map produced on a mobile communication device may be transferred to a console device without user or author modifications to the map.

In the same way, the same map created on the mobile communication device may be transferred to another mobile communication device without modification, but may also be transferred to a less capable device which would employ the use of the sample reduction aspect of the instant invention.

In the case of the sample enlargement algorithm, process capabilities may be required to enhance the image quality of certain portions, objects or all of the may. This may be done through enhancement lookups for the objects on the map to be enlarged.

For example, if a tree has been placed on the map using a palette, the tree may take up only 100×120 pixels on the map. However, a target device may require the same tree to be 400×480 pixels in size. The detail of the tree may be insufficient to simply scale. In this instance, the algorithm may make a determination to read the marker of the tree object, which is part of each object paced on the map. This tree object marker may have one or more highly detailed trees of varying sizes available to use in a data store. The algorithm may then search for a tree using the object marker which can be used to replace the existing tree on the map and replace it while the tree dimensions remain the same but have much more detail as the artwork fits the desired target dimensions better than a simple enlargement of the existing object on the map.

In the case of a sample reduction, bicubic reduction and/or anti-aliasing methods, as well as other potential methods may be used to reduce the map size and capabilities. Specific issues must be considered where player pathways must not be obstructed where a map size reduction might impact these pathways. In this case, the player pathways require the highest preservation priority in providing device-to-device transferable sample reduction.

In the case of sample enlargement calculations, the player avatar dimensions must be considered so that the field of play does not become so large that the avatar requires a disproportionate amount of the display or play field. In this respect, even though a player path may be widened, it should be related to avatar dimensions (smallest and largest) so that specific details of the map may be seen by the player.

The map related settings may contain aspects such as the target avatar dimensions, the aspect ratio of the target display, the processing capabilities of the target computing unit, the dimensions of the target display, the number of frames per second which can be processed on the target device, the sprite dimension limits of the target device rendering engine, etc. These aspects, as well as aspects of the particular map, such as pathway width, map dimensions, and other aspects may be made available to the sample reduction and/or sample enlargement algorithms of the instant invention.

Moreover, the most important aspects of the instant invention includes the method of storing a map on a server which may be accessed by more than one type of device, the method in which it scales the map from a large map to a map which fits on a smaller, less capable device without losing the important game-specific required data, and the method in which the instant invention may access one or more disconnected objects to build an enlarged map for playing on a more capable device than the device in which the map was originally created.

In addition, the instant invention includes the ability to store, transfer, retrieve and re-establish one or more savepoints within one or more application on the receiving one or more devices. Therefore a first device has the ability to transmit one or more data and one or more savepoints to one or more receiving devices. The one or more receiving devices, comprised of at least one second device, receive the one or more data and one or more savepoints. The one or more second devices, receiving the one or more savepoints and one or more data, associate the one or more received data from the first device to one or more applications, and the one or more applications can begin running, and receive the one or more savepoints to set the one or more applications using the received one or more data to the point at which the user had transferred the data and application from the first device to the one or more second receiving devices. For example, a user may be working on a spreadsheet on their desktop computer, but they need to go to a meeting. Using the instant invention, they can synchronize the spreadsheet from their desktop machine to their mobile electronic device, for example, and the mobile electronic device receives the data and the point at which the synchronization occurred, the savepoint, and the user can resume their work on the spreadsheet while attending the meeting. Once the meeting is finished, the spreadsheet on the user's desktop computer may be synchronized from the user's mobile device with the updates made during the meeting and the savepoint from the mobile electronic device so that the application on the user's desktop is updated and opened to the savepoint from the mobile electronic device.

DETAILED DESCRIPTION OF THE INVENTION

Figure 1:
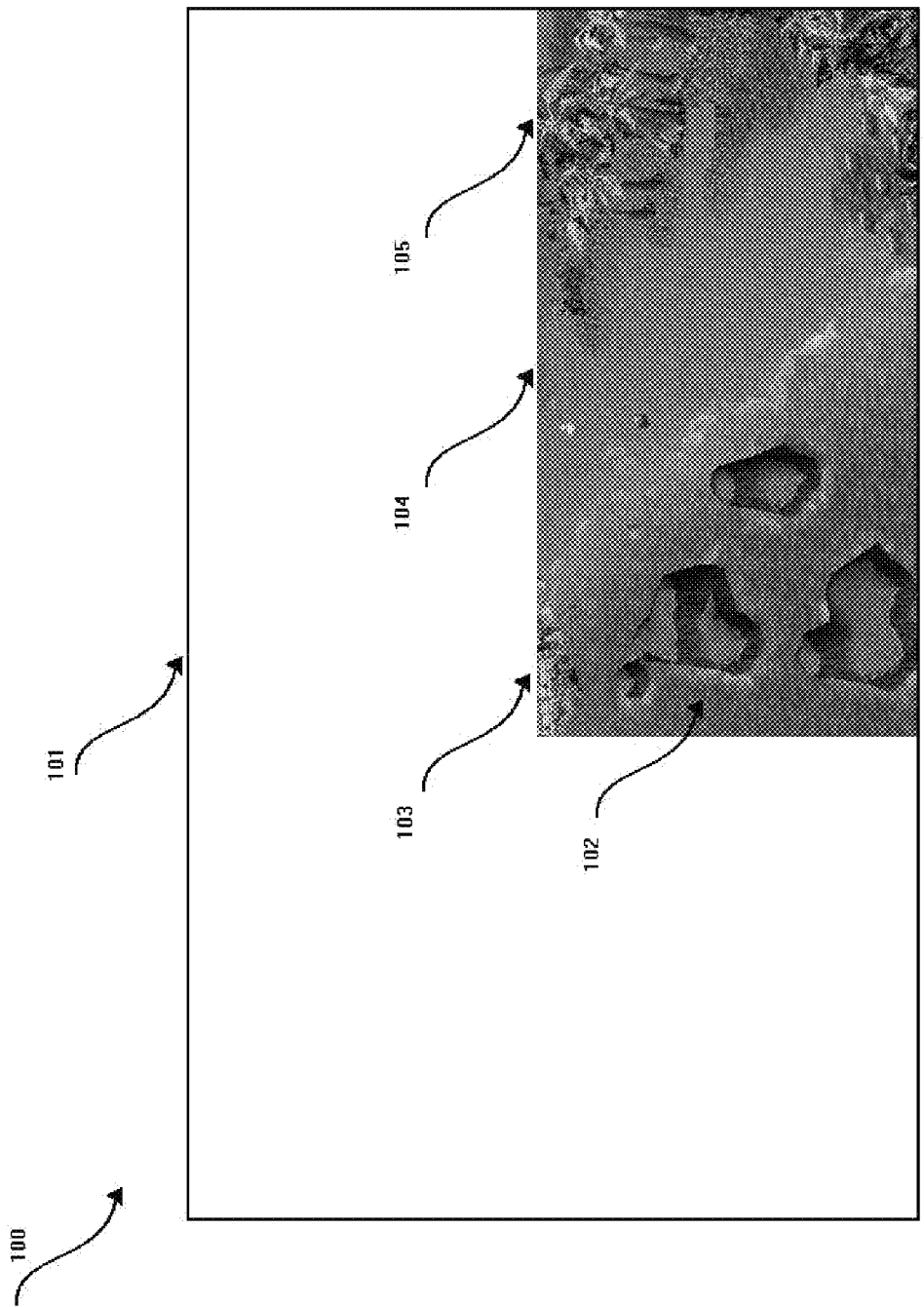
FIG. 1 is a prior art example of a game map having one level.

Referring to FIG. 1, a prior art example map 100 is shown. The map resides in a workspace 101, allowing the map creator to add more information to the workspace. Completed areas of the map include the water and rocks 102, the shore line 103, the beach 104 and the jungle line 105. Once the map is loaded into the game software, an avatar can move in the map space within the areas designated by the map creator. In this prior art example, the map occupies a 1024×768 pixel space.

Figure 2:
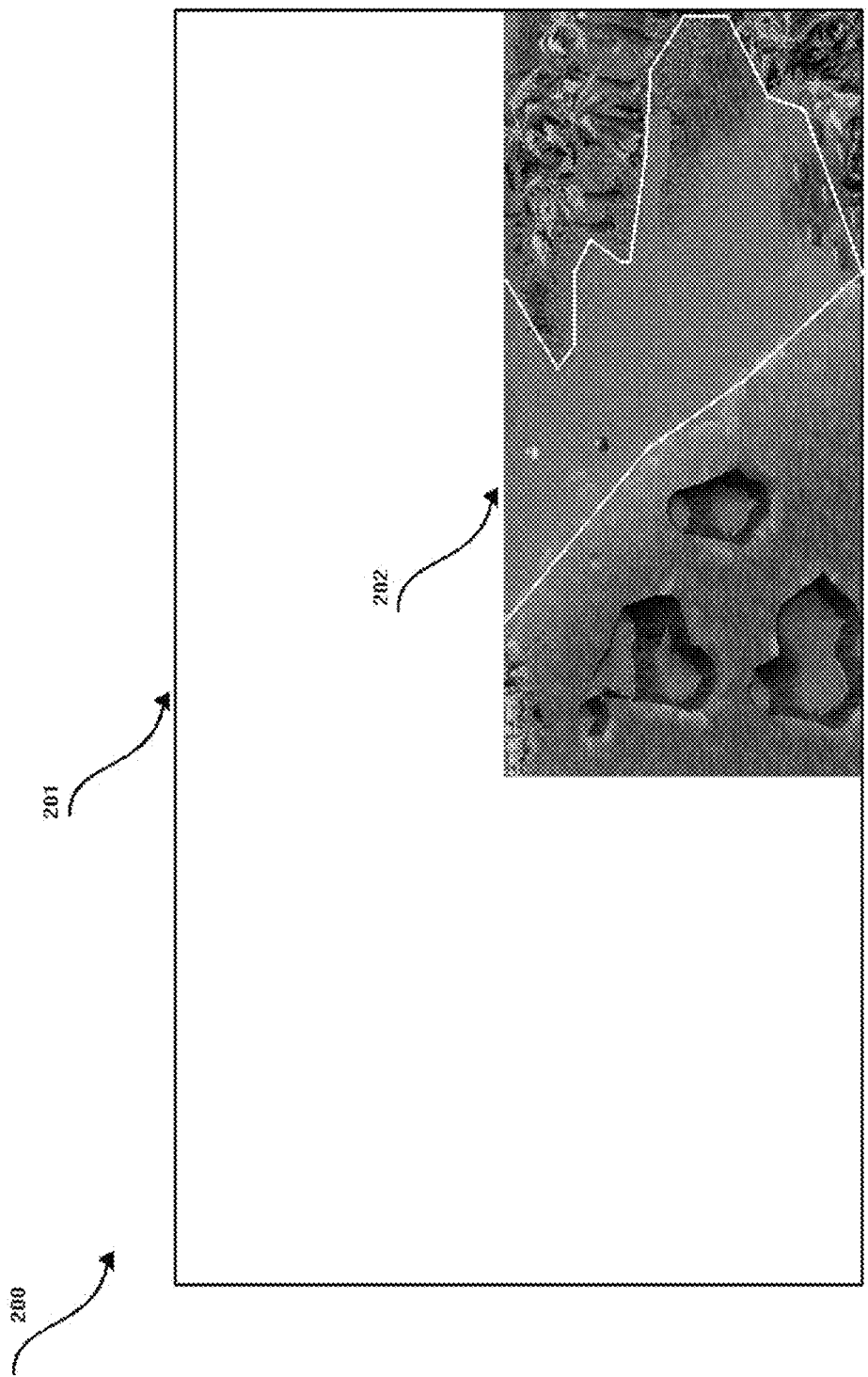
FIG. 2 is a prior art example of a game map with the character pathway.

Referring now to FIG. 2, a prior art example map 200 is shown. The map resides in a workspace 201, allowing the map creator to add more information to the workspace. The completed area of the map is inside the workspace 201. In the completed workspace, the map creator can designate an area where the avatar can freely move. This area 202 in this example is enclosed in a white border. Other avatars or avatars with specific vehicles, such as a boat or a plane can move in other places which a walking avatar may not be able to.

Figure 3:
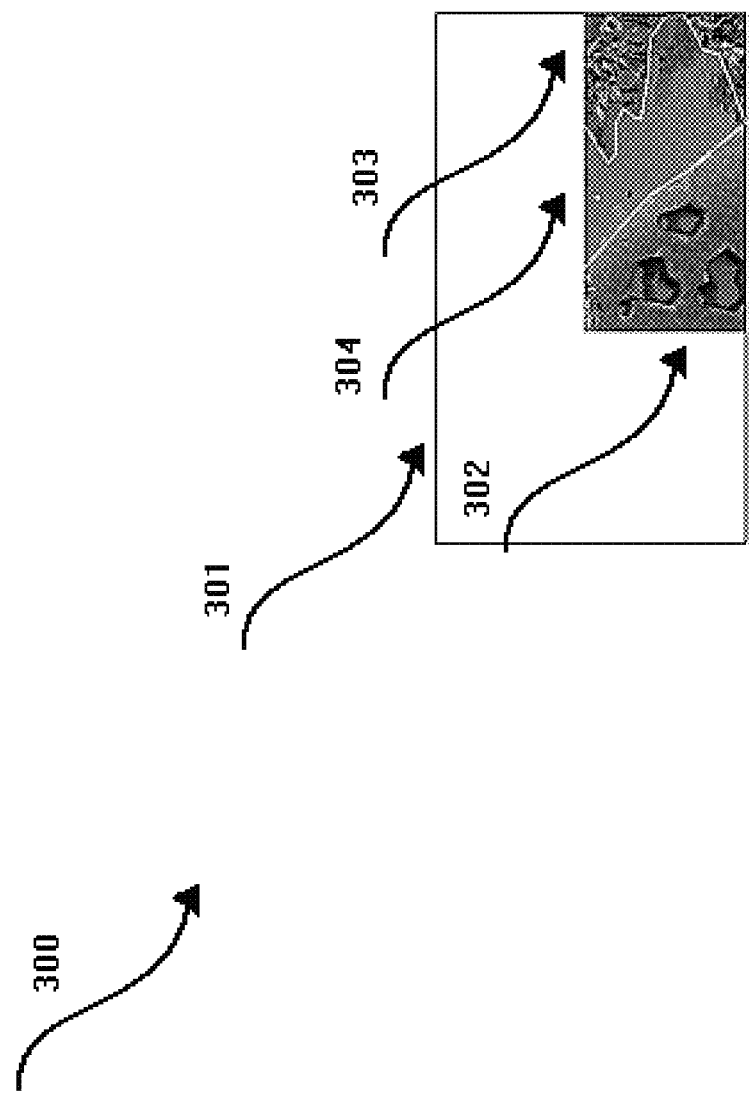
FIG. 3 is an example of the results of the algorithm to reduce a map.

Referring now to FIG. 3, a reduced sampling of the map from 100 is shown in 300 of the instant invention not fully shown. The map 100 is reduced to a quarter-scale as an example by the reduction sampling algorithm of the instant invention to a 256×192 dimension. The completed portion of the map resides in the workspace 301. The tree line 105 has been reduced to the re-sampled tree line 303. The pathway 104 has been reduced to a re-sampled walkway 304. The rocks and water line 102 has been reduced to a re-sampled shoreline 302. The avatar would move within the walkway space 304 as allowed by the map creator. In this example, the walkway 304 for the avatar has been maintained so that the avatar can freely move through it even in the reduced size. This reduced map 301 is shown as an example map which can be placed into game software running on, for example, a mobile communication device.

In order to reduce the map using a reduction sampling algorithm, the instant invention may use a bicubic interpolation algorithm, for example. This algorithm consists of a mode in the x and y plane where we are moving from f(t) to g(t/2) so that we have a 2:1 reduction as described in the above example where the map is being reduced from a 1024×768 workspace to a 256×192 workspace. So, if we had a sample [0 1 2 3 4 5 6 5 4 3 2 1 0 1 2 3 4 5 6 5 4 3 2 1 0] of 26 points, we would first interpolate the nearest neighbors, becoming the series [0 0 2 2 4 4 6 6 4 4 2 2 0 0 2 2 4 4 6 6 4 4 2 2 0 0]. Finally, we reduce the sample by 2 giving the final result [0 2 4 6 4 2 0 2 4 6 4 2 0]. The equation for this would be given as: f(t)=s*f(floor(t))+(1−s)*f(ceil(t)). Bicubic interpolation achieves results between the extremes of pixel replication and interpolation by estimating the sharpness of edges by calculating the derivatives at each sample and then fitting a cubic curve between the samples. In order to handle the natural blockiness of the pixel arrangements in either a reduction or enlargement sampling result, the image map must be antialiased. The blockiness appears most pronounced along the edges of borders. The anti-aliasing is generally performed by a two-dimensional discrete Fourier transform given by cos $(2j\pi x)*\cos(2k\pi y)$.

Other scaling algorithms may be used instead of the bicubic interpolation algorithm. In addition, other algorithms can be used in conjunction with the scaling algorithm of choice such as the unsharp mask. For example, the sharpening function of a pixel at (x,y) is equal to the function at (x,y)+k*g(x,y) where k is the scaling constant and g(x,y) is the edge function of the input image. So the function $f_{sharp}(x,y)=f(x,y)+k*g(x,y)$ can take a mean filter, such as a 3×3 pixel sequence and subtract the values of the mean filter from each 3×3 area of the given image to raise the edges using the scaling constant k in the range between the values of 0.0 and 1.0, preferably between 0.2 and 0.7.

Figure 4:
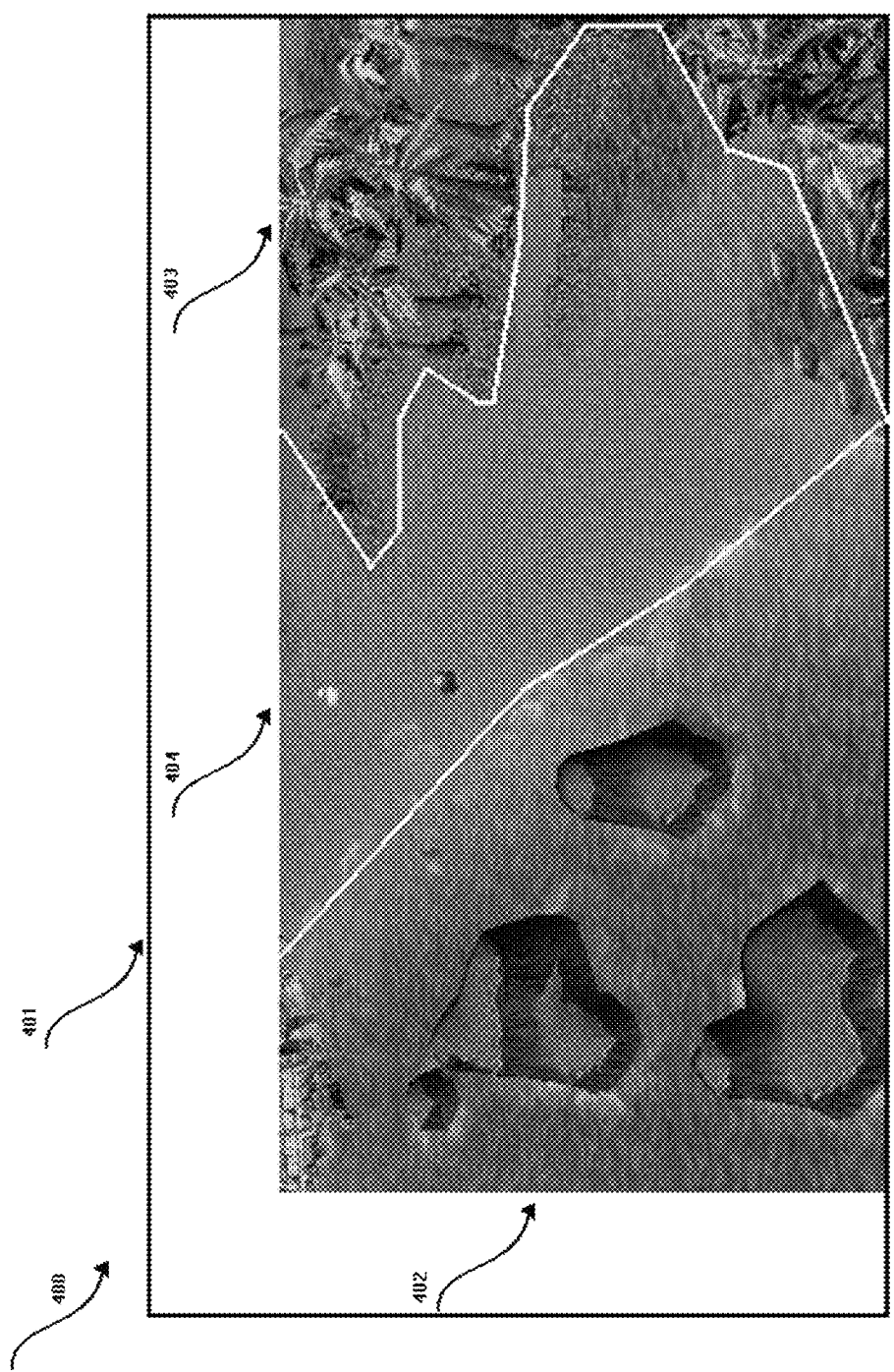
FIG. 4 is an example of the results of the algorithm to enlarge a map.

A first system, for example, may be a mobile communication device and a second system may be a console system. The respective system map distributions can be shown in FIG. 3 and FIG. 4 where FIG. 3 is illustrative of a reduced map sampling for a mobile communication unit and FIG. 4 is the same map yet sampled at a higher frame size for a more capable system such as a console. The map sample is transferred from a server or other computing system, the scaling system, to either the first system or the second system as described in more detail using FIG. 11. The first system may transmit one or more system detail files to the scaling system which reads the one or more system detail files and determines from the values in the file whether the map or other data must be enlarged, reduced or left alone. In the case of the first system, being a mobile communication device in this example, the map being a large map, must be reduced to fit the request made by the first system. In this case, the scaling system reduces the map or other objects to the size representative to the scale of the system detail scale while maintaining important path information. In the case of the console system, it too can transmit one or more system detail files to the scaling system. Since the map size is not large enough to fit the size of the system detail requested size, in the given example, the map scale must be enlarged. In this case, the scaling system then enlarges the map data and then transmits the enlarged map data to the requesting system, in this case, the console unit.

Referring now to FIG. 4, an enlarged sampling of the map from 100 from FIG. 1 is shown in 400 of the instant invention not fully shown. The map 100 from FIG. 1 is enlarged to a 4-times scale as an example by the enlargement sampling algorithm of the instant invention to a 4096×3072 dimension. The completed portion of the map resides in the workspace 401. The tree line 105 from FIG. 1 has been enlarged to the re-sampled tree line 403. The pathway 104 from FIG. 1 has been enlarged to a re-sampled walkway 404. The rocks and water line 102 from FIG. 1 has been enlarged to a re-sampled shoreline 402. The avatar would move within the walkway space 404 as allowed by the map creator. In this example, the walkway 404 for the avatar has been enlarged to scale so that the avatar can freely move through it proportionately. This enlarged map 401 is shown as an example map which can be placed into game software running on, for example, an advanced console device.

The enlargement algorithm of the instant invention posses a more advanced issue than simply sampling the pixels and interpolating the results. Sometimes, especially with a 4-times enlargement requirement, the resulting quality of the image is diminished because the inherent information in the source data is insufficient to satisfy the quality required for the desired output. In this case, much of the workspace may be sampled using a magnification algorithm much like the bicubic interpolation as described above. However, the algorithm converts the map data to the YUV color space to represent a more detailed signal, improving the resulting signal clarity. This is done primarily due to the fact that artifacts of the image in a reduced source will appear much more pronounced once the image has been enlarged.

The primary step is an analysis of the 3×3 area of the source pixel. At first, we calculate the color difference between the central pixel and its 8 nearest neighbors. Then that difference is compared to a predefined threshold, and these pixels are sorted into a dual set of categorizations such as "near" and "far". The 8 neighbors have 256 possible combinations.

The secondary step requires filtering based on a 256-entry lookup table. Each entry is based on the dual set of near and far color space assignments which describes how the colors of the source pixels from the 3×3 area are mixed to form interpolated pixels of the filtered image. In using the YUV color space to calculate color differences, additional priority is given to the Y (brightness) component while lower priority is given to the color components U and V. Each color combination having the most probable vector representation of the area must be determined, while maintaining the boundaries between the different colored (not shown in color, depicted in grayscale) areas of the image. The vector representation is then rasterized to the higher resolution using the anti-aliasing algorithm, storing the result.

Figure 5:
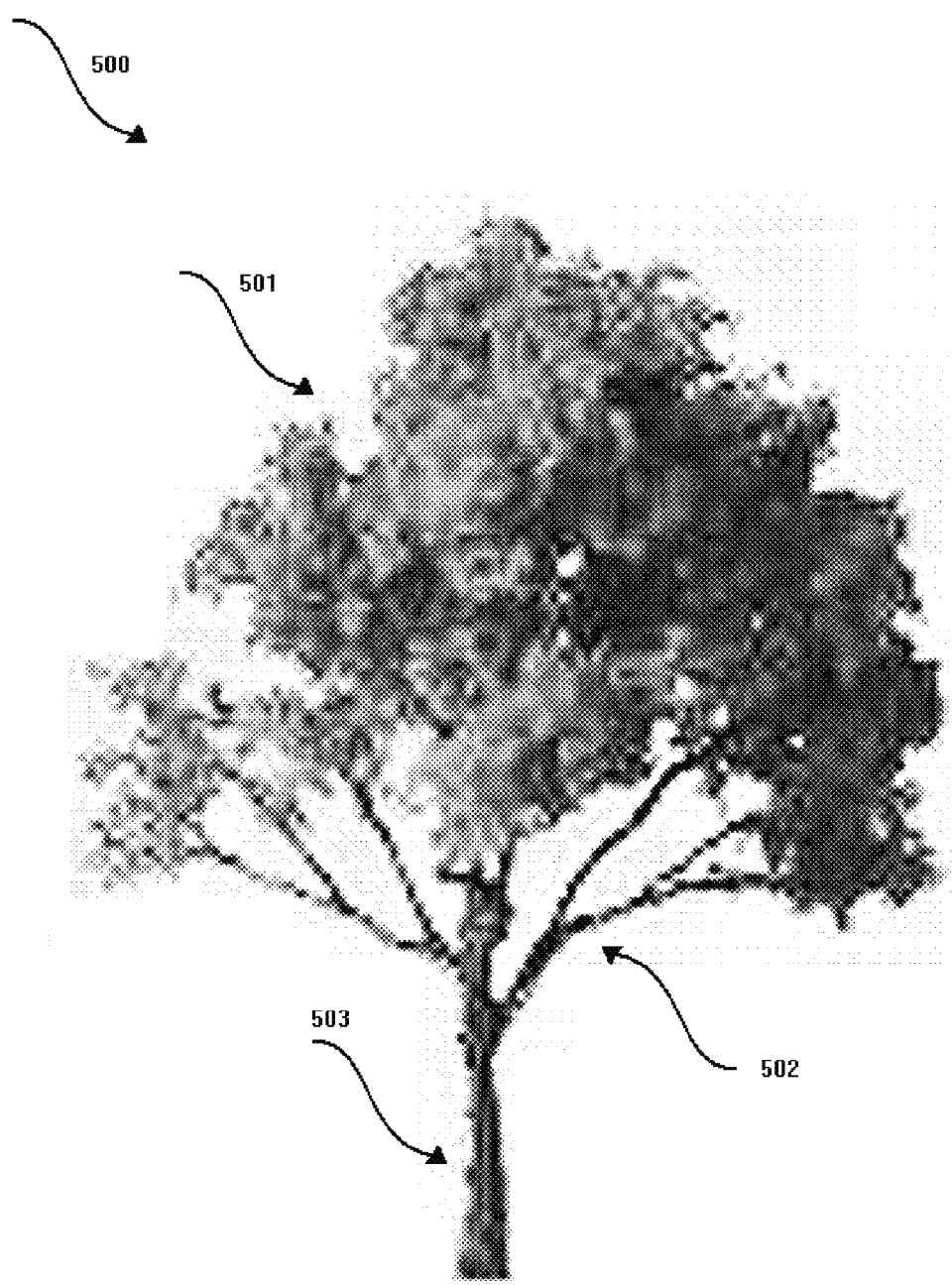
FIG. 5 is an example of a tree enlarged with the described algorithm.

Referring now to FIG. 5, an enlarged image is shown 500 resulting from the use of one or more algorithms in the instant invention. The image 500 has been enlarged using the bicubic interpolation algorithm and none or more other filters and algorithms as an example. The image 500 using the described one or more algorithms, although enlarged substantially, maintains a great amount of color (not shown in color, depicted in grayscale) and image clarity. The image also maintains much of the original detail. The top of the tree 501 is smooth and defined. The branches 502 and trunk 503 are also smooth and defined. This will be shown in more detail in FIG. 7.

Figure 6:
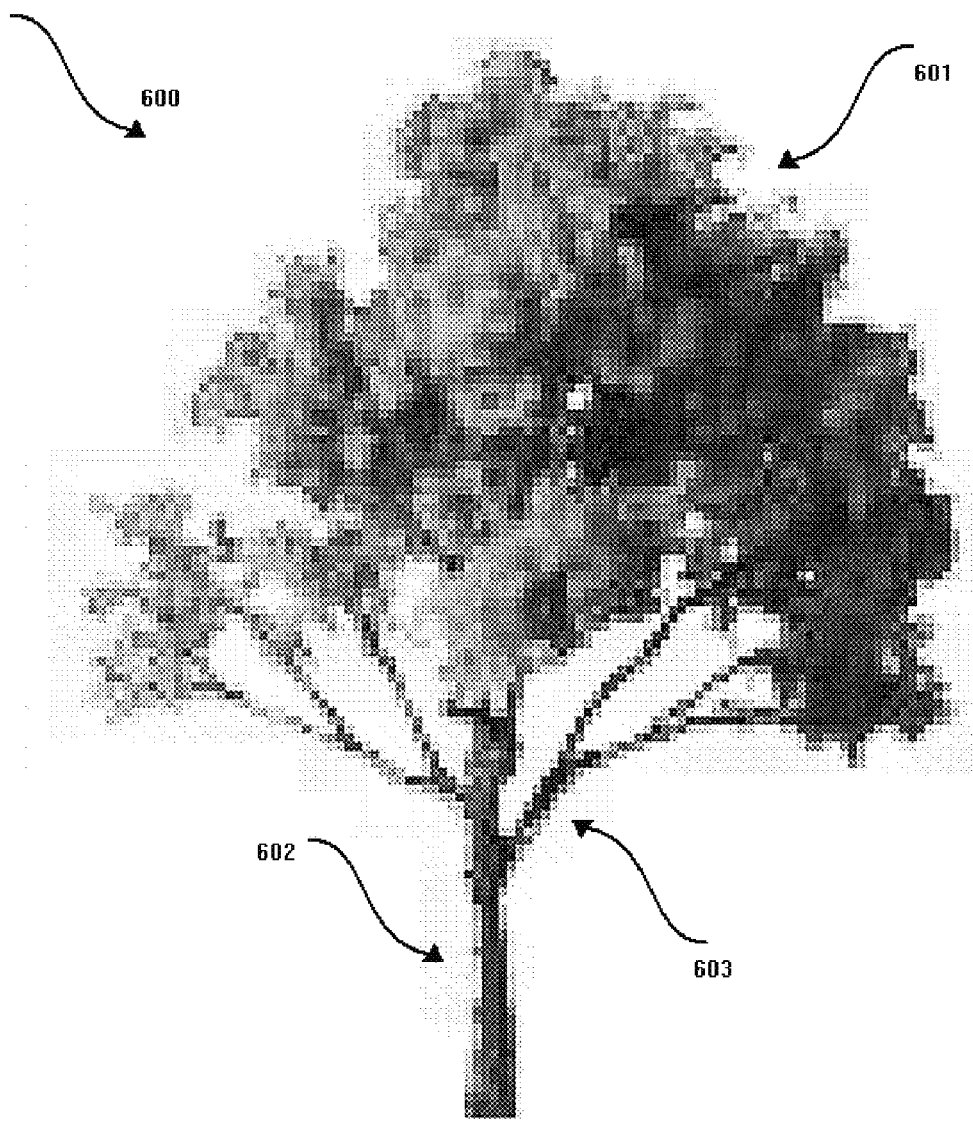
FIG. 6 is an example of a tree enlarged without the use of the described algorithm.

In contrast, now referring to FIG. 6, an example image 600 is shown without the use of the described one or more algorithms. This image 600 has been enlarged using a nearest neighbor algorithm which would be an example algorithm used when the instant invention is not utilized. The image 600 has lost several layers of color (not shown in color, depicted in grayscale) detail, portions of the image have been lost and the image is pixilated. The issue described is also pronounced when reducing an image to a smaller size due to the reductions used to meet the needs of a reduced pixel area when the instant invention is not utilized. The top of the tree 601 is pixilated. The branches 603 and trunk 602 are also pixilated. Portions of the trunk 602 are also missing and the color levels (not shown in color, depicted in grayscale) are reduced considerably. In addition to particular pixels appearing to be missing, some pixels may appear which do not exist due to the oversampling of the simple scaling when the instant invention is not utilized. This will be described in more detail in FIG. 8.

Figure 7:
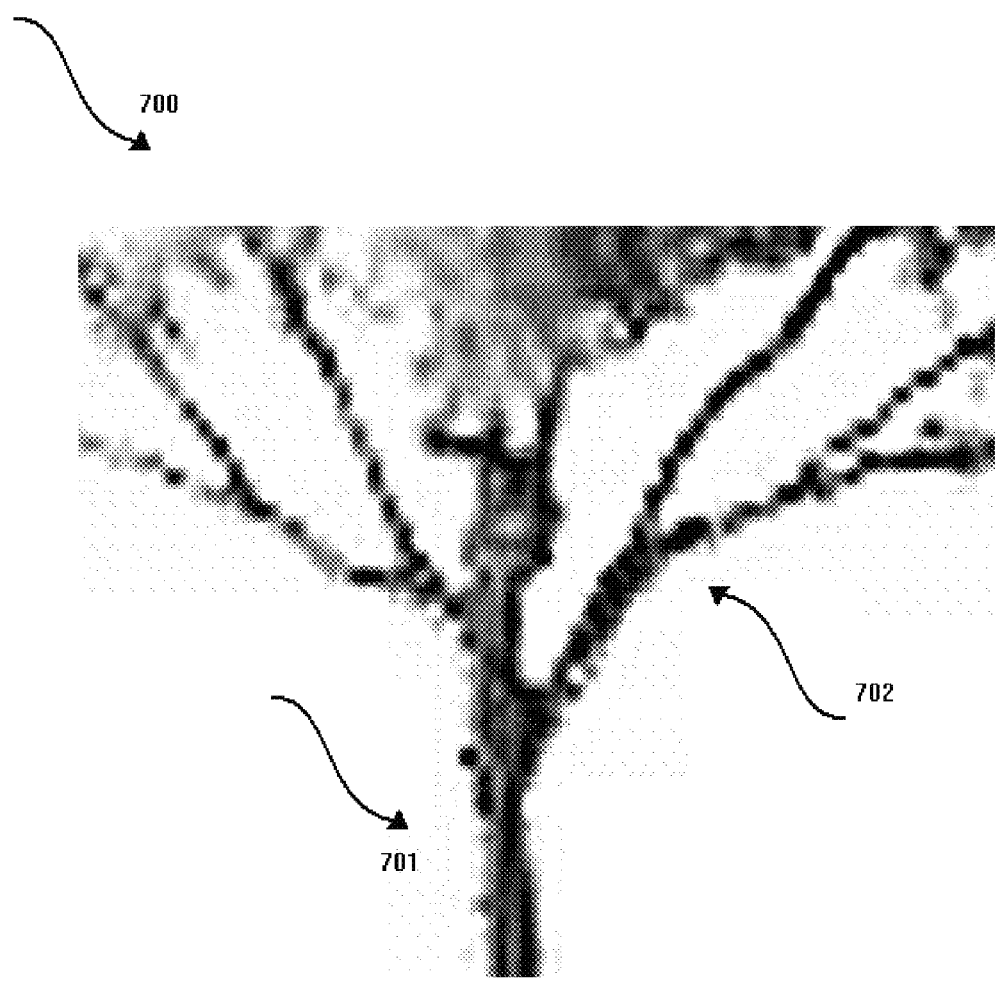
FIG. 7 is a close up view of the same enlarged tree with the described algorithm from FIG. 5.

Now referring to FIG. 7, an enlarged portion of FIG. 6 is shown 700. The image 700 shows the capabilities of the one or more algorithms described in the instant invention at the pixel level. The trunk 701 and branches 702 have good quality and soft appearance as the detail of the original image is extrapolated properly and information is not lost. Also note that the image is not blocky as would be the case in the same magnitude of expansion as normally done, for example, using the nearest neighbor extrapolation, shown in more detailing FIG. 8.

Figure 8:
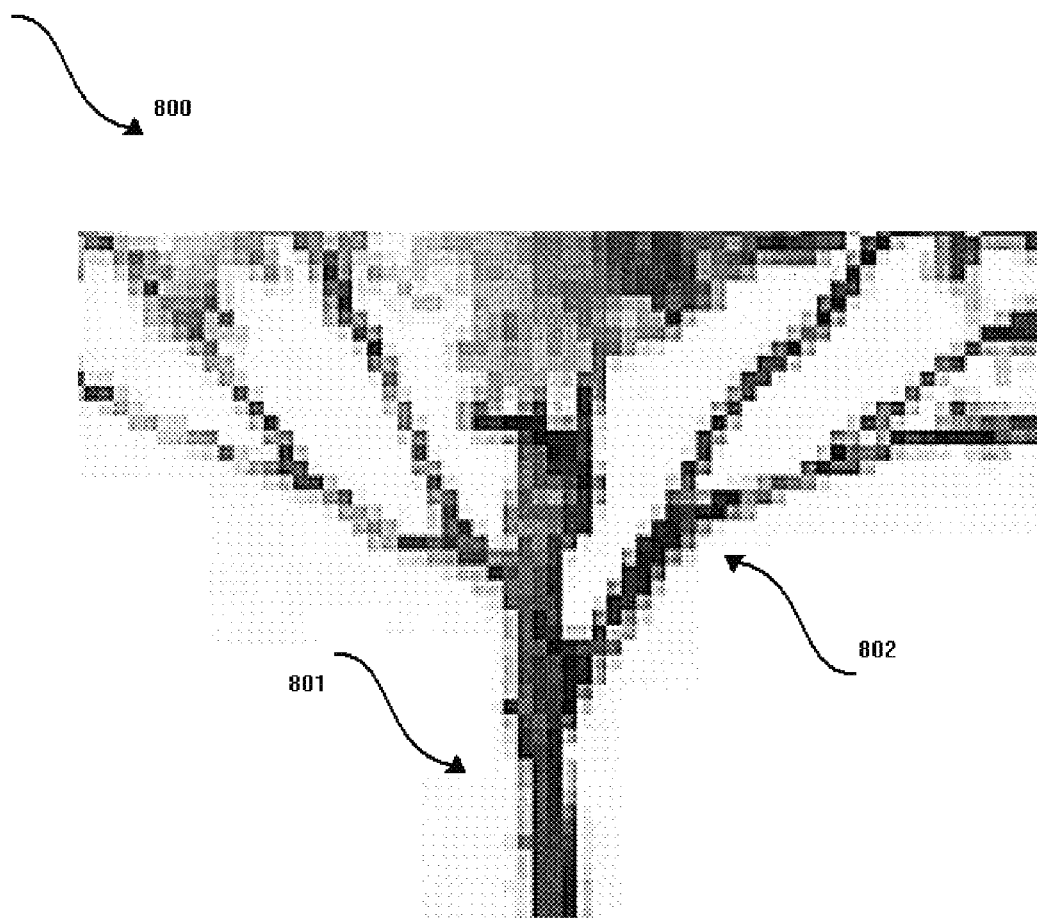
FIG. 8 is a close up of the same enlarged tree without using the described algorithm from FIG. 6.

Now referring to FIG. 8, an enlarged portion of FIG. 7 is shown 800. The image 800 further demonstrates the contrasting capabilities of the one or more algorithms described in the instant invention by showing the blockiness of the image when extrapolated using other methods such as the nearest neighbor algorithm. The trunk 801 and branches 802 have poor quality and pixelated appearance as the detail of the original image is extrapolated by averaging neighboring pixels to produce the image. When this is done, the branches 802, for example, take on pixels which are not found in the original image and the blocks which make up the image are "soiled" with surrounding pixels, especially apparent in distinct contrast regions. This is shown in the trunk 802 with the gray pixels which have been "added" to the image.

Figure 9:
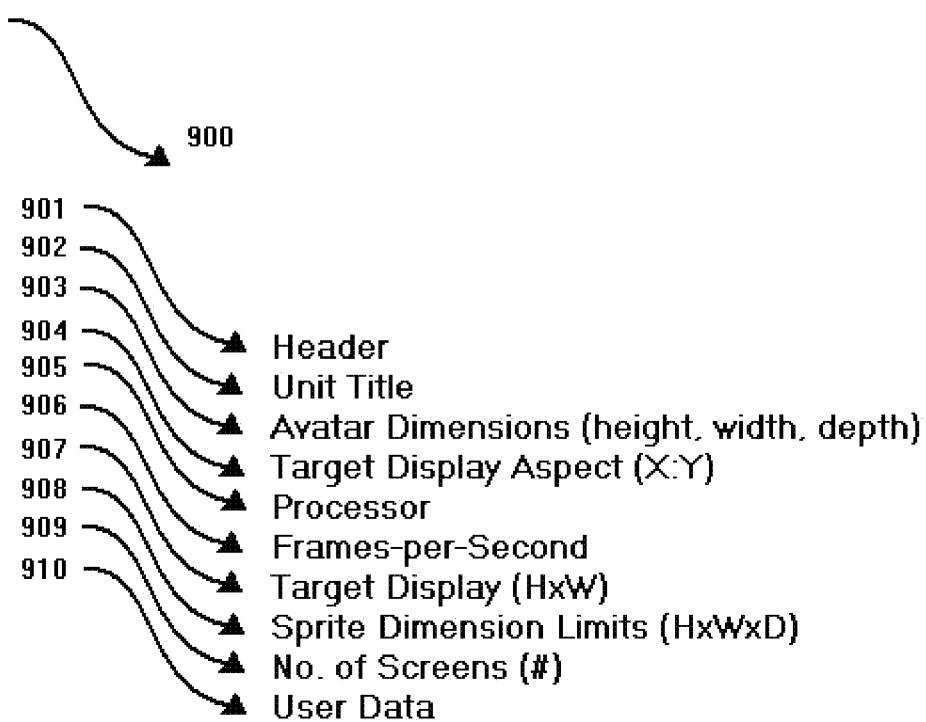
FIG. 9 is an example of the target device settings array used in the instant invention.

Referring now to FIG. 9, a sample of the target device map related settings 900 is shown. The settings may include entries such as a header 901, a unit title 902, an avatar dimension 903, a target display aspect ratio 904, a processor capability 905, a frames-per-second capability 906, a target display dimension 907, a sprite dimension limit 908, a number of target screens 909, a user data segment 910, among other potential items. These described settings would come from the game software and would be transparent to the player and the map creator.

The header 901 may include information pertaining to the target device, such as its location, capabilities, etc.

The unit title 902 may contain a descriptive sentence or paragraph describing the target device and/or other characteristics.

The avatar dimensions 903 may be height, width of the avatar and depth if the avatar has three-dimensions. This information may be used to define the minimal pixel space required by the pathways for the game play. In the event of a map reduction, these pathways would need to be maintained so that the largest possible avatar given these required height and width dimensions would easily be able to pass through. If a pathway constricts the avatar's motion, the surrounding non-pathway areas would need to be compromised and reduced in a greater scale so that the available pathway would be maintained.

The target display aspect ratio 904 may be used to define the skew of the sampling algorithm. For example, if the source aspect ratio is 4:3 and the target aspect ratio id 16:9, the enlargement or reduction algorithms must take this into consideration and assign pixel interpolation to each of the map pixels in a general method so that the resulting map is evenly distributed.

The target processor 905 would provide the reduction or enlargement algorithms the ability to determine the capabilities of the rendering system. In this manner, more capable machine architecture may be able to handle a greater number of colors (not shown in color, depicted in grayscale) or details whereas less capable machine architecture may not. In the likeliness of a lesser machine architecture, the reduction algorithm may be required to reduce the number of available distinct colors (not shown in color, depicted in grayscale) in the result map, for example.

Likewise, the target frame-per-second setting 906, would provide the enlargement or reduction algorithms the information needed to determine the resulting map capability. In the case of a less capable architecture, the frames-per-second may be less than the map creator envisioned for the finished product. In this case, the resulting map details may be reduced so that the video rendering requirements are less critical so that the expected frames-per-second is maintained.

In the same manner, the target display size 907 in pixels may allow the enlargement or reduction algorithms the ability to calculate the signal quality of the resulting map by the given parameters available for the interpolation segments available to the respective algorithms. In this way, the nearest neighbors can be adequately derived and used to produce the desired map result.

The sprite dimension limits 908 may be used to define the maximum dimensions of any of the animation objects on the map. These may exist in two-dimensions or three-dimensions. For example, one or more cannon may appear on the map by the game software. These cannon will require specific areas of pixels and must be able to be moved within the map from one point to another without obstruction. In this case, the pathways are again considered in much the same manner as the pathways were considered for the avatar dimensions 903. However, the sprite may have a different series of animations available to it that dictate a differing set of dimensions than the given avatar dimensions.

The number of screens 909 available on the target device may also impact the resulting map size, aspect ratio and playable areas. For example, a portion of a map may appear on the screen yet is not navigable until the player traverses to that portion of the map. In this case, specific map functions may not be required until the player reaches this portion of the map even though the display of the portion of the map is revealed before it is accessible.

The user data section 910 may include any number of other important pieces of information which may be required by the enlargement or reduction algorithms. Other information may also be provided such as color depth, pixel width, etc., which is not described in this example file 900.

The file segment shown in 1000. has a beginning of file indicator 1011 and an end of file indicator 1012, being some given series of codes based on one or more protocols being used. For example, in a radio transmission between two wireless devices, the BOF code 1011 may be 0x55 and the EOF code 1012 may be 0xC1 yet this is irrelevant in the instant invention and is only shown for the purposes of example. The example header 1013 is shown and the example unit title 1014 is shown. The avatar dimensions 1015 are shown 0x64, 0x78 and 0x01 respectively given for a single-depth image 100× 120 pixels. The aspect ratio 1016 is shown as 0x10 by 0x09 which relates to a 16:9 aspect ratio. The processor 1017 is described as a Xenon 12345 processor which may be used to relate to the capabilities of the device the map or other data is targeted for. The frames per second 1018 is shown as 0x78 which equates to a 120 FPS capability while the screen dimensions 1019 are given as 0x800 and 0x480, related to a 2048×1152 screen dimension. The sprite dimension 1020 is also given as 100×100 pixels with an animation frame depth of 15 frames. The number of screens 1021 which can be accessed by the system for the given map request is 5 in this example and the user data 1022 is shown at the end of the file.

Figure 11:
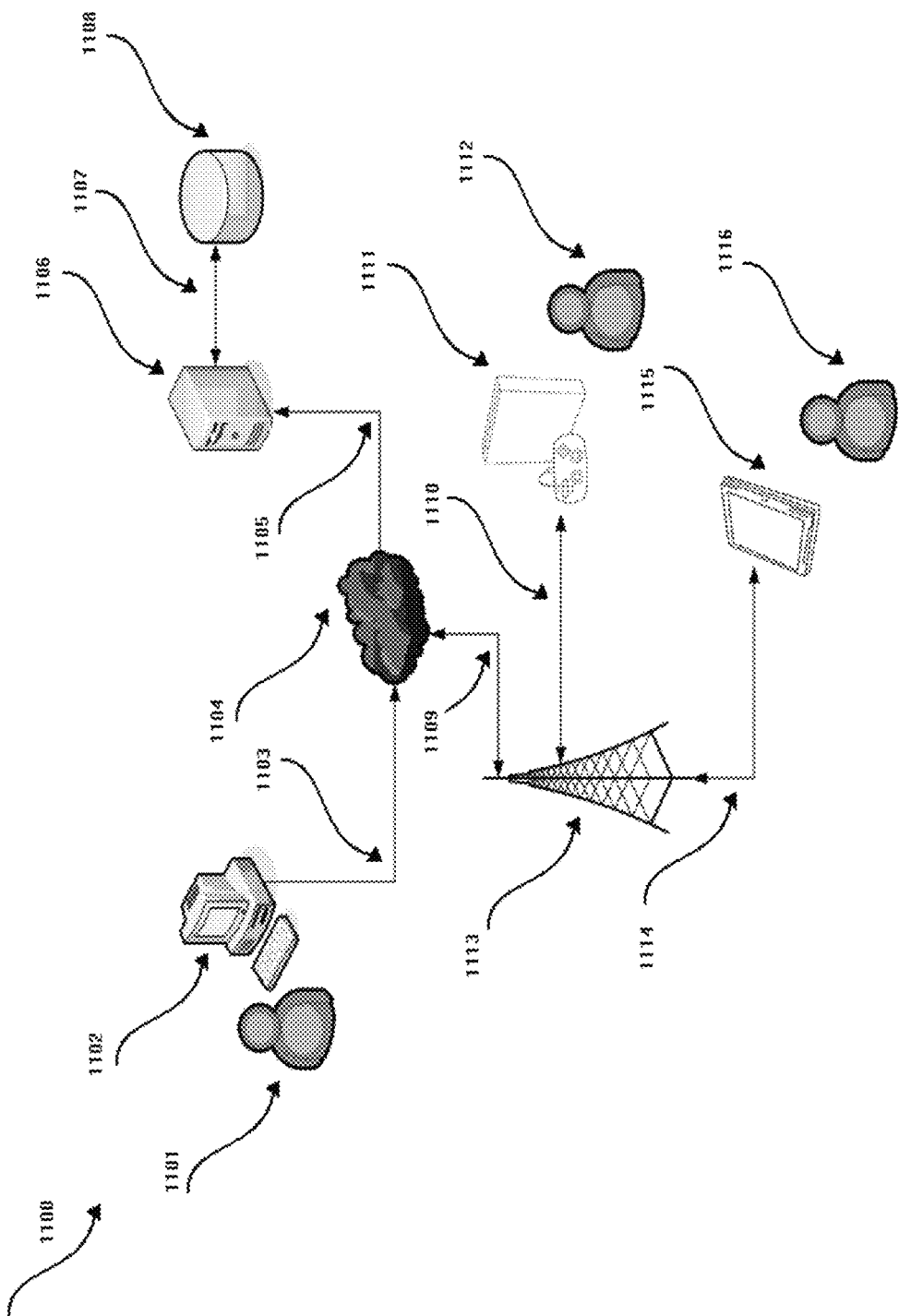
FIG. 11 is a representative communication flow of the instant invention being used for two different types of devices.

More detail regarding the file and file structure and the way in which values within the file effect the outcome of the resulting map or other element is described further in FIG. 11.

Referring now to FIG. 11, an example of the architectural flow of the instant invention 1100 is shown. The one or more map creators 1101 may create or update one or more maps and/or map detail images on one or more computing devices 1102. The one or more maps and/or map detail images can then be transferred using a transfer protocol 1103 through a network 1104 using a transfer protocol 1105 to a map server 1106. The map data and/or map detail images may be transferred from the map server 1106 using a transfer protocol 1107 to a data store 1108. A program on the map server 1106 may provide a programmable or user-instructed interface which allows the client systems 1111 and/or 1115 to access either the map data and/or map detail images as needed by either the reduction or enlargement algorithms which reside on the map server 1106.

One or more mobile communication devices 1115 may access a network 1113 through a network protocol 1114 which accesses a network 1104 using a network protocol 1105 to access a map server 1106. The one or more mobile communication devices 1115 may transmit one or more target map settings data which may be utilized by the map reduction software residing on the map server 1106 which handles the map request. In the case of a larger map residing on the map server 1106, the map reduction software will read the target map settings in the map request made by the one or more mobile communication devices 1115 and re-sample the requested map based on the target map settings. Once the map has been reduced to meet the request, the map is transferred, either uncompressed or compressed, to the network 1104 through a network protocol 1105 and another network protocol 1109 to a network antenna 1113, for example, using another network protocol 1114 to one or more mobile communication devices 1115. At this point, the user 1116 can play one or more games using the one or more reduced maps received from the map server 1106 or they may be able to modify the reduced map further, play it and/or send the modified reduced map to the map server 1106 for other players to use.

All of the exchanges discussed for the map and reduced map data may also be done using a local network, optical media or other storage device.

One or more console or more capable devices 1111 may access a network 1113 through a network protocol 1110 which accesses a network 1104 using a network protocol 1105 to access a map server 1106. The one or more console or more capable devices 1111 may transmit one or more target map settings data which may be utilized by the map enlargement software residing on the map server 1106 which handles the map request. In the case of a smaller map residing on the map server 1106, the map enlargement software will read the target map settings in the map request made by the one or more console or more capable devices 1111 and re-sample the requested map based on the target map settings. Once the map has been enlarged to meet the request, the map is transferred, either uncompressed or compressed, to the network 1104 through a network protocol 1105 and another network protocol 1109 to a network antenna 1113, for example, using another network protocol 1110 to one or more console or more capable devices 1111. At this point, the user 1112 can play one or more games using the one or more enlarged maps received from the map server 1106 or they may be able to modify the enlarged map further, play it and/or send the modified enlarged map to the map server 1106 for other players to use.

All of the exchanges discussed for the map and enlarged map data may also be done using a local network, optical media or other storage device.

In addition, the one or more maps available on the map server may be smaller than a given one or more mobile communication devices 1115, for example, which would require the enlargement algorithm, residing on the map server 1106 to resample the existing map data and create a new enlarged map data which would be used by the one or more mobile communication devices 1115.

Likewise, the console or other more capable device 1111 may require a reduced map data based on the size or requirements of the created map data requested.

The map reduction or enlargement software may also reside on the mobile communications devices 1115, console or other more capable devices 1111 so that the map data may be requested from the map server 1106 and then re-sampled for the appropriate device based on it's capabilities. The re-sampled map data may then be played or transmitted to the same or another map server 1106 which can then be downloaded and/or used by another player.

In order to further illustrate the process in which the instant invention operates, a first system 1115, for example, may be a mobile communication device and a second system 1110 may be a console system. The respective system map distributions can be shown in FIG. 3 and FIG. 4 where FIG. 3 is illustrative of a reduced map sampling for a mobile communication unit 1115 and FIG. 4 is the same map yet sampled at a higher frame size for a more capable system such as a console 1110. The map sample is transferred from a server 1108 or other computing system, to the scaling system 1106, to either the first system 1115 or the second system 1110. The first system 1115 may transmit one or more system detail files to the scaling system 1106. The scaling system 1106 then reads the one or more system detail files and determines from the values in the file whether the map or other data must be enlarged, reduced or left alone. In the case of the first system 1115, being a mobile communication device in this example, the map being a large map, must be reduced to fit the request made by the first system 1115. In this case, the scaling system 1106 reduces the map or other objects to the size representative to the scale of the system detail scale while maintaining important path information. In the case of the console system 1110, it too can transmit one or more system detail files to the scaling system 1106. Since the map size is not large enough to fit the size of the system detail requested size, in the given example, the map scale must be enlarged. In this case, the scaling system then enlarges the map data and then transmits the enlarged map data to the requesting system, in this case, the console unit.

The network protocols 1103, 1105, 1107, 1109, 1110, and 1114 described in system 1100 may all be different or the same for example, Ethernet, UDP, WiFi, Bluetooth and could be something as simple as an Infrared transfer of a file or simple copy of a file using a USB or other device. The elements used to describe communication can be replaced with any type of transfer element. In addition, the network cloud 1104 and wireless tower 1113 are used for illustration only and are not required for the instant invention.

A map or other game file can, for example, be generated by one or more game developers, players, etc. 1101 on one or more computing devices 1102 and placed from the one or more computing devices 1102 onto one or more servers 1106. The one or more servers 1106 may then store the map or other game files on one or more data stores 1108.

Figure 10:
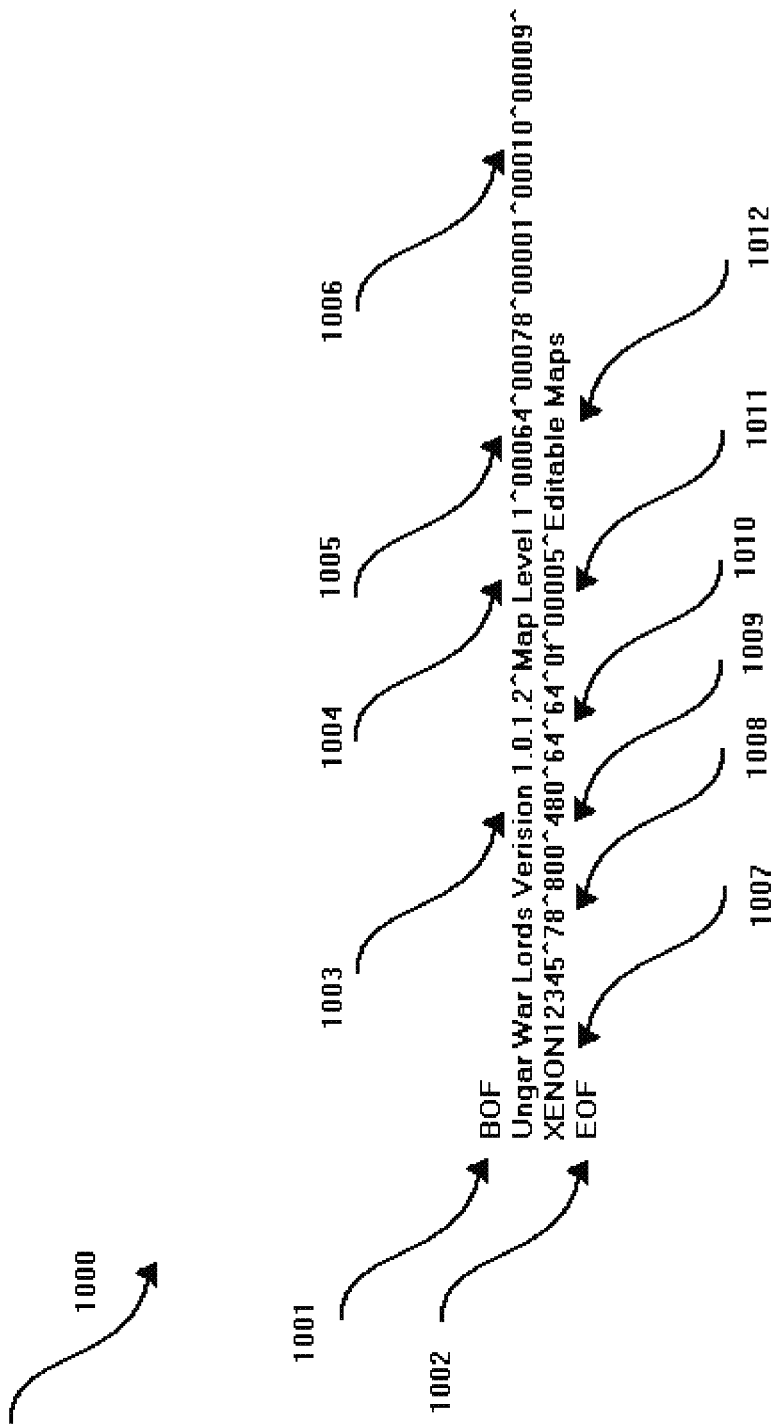
FIG. 10 is an example of the contents of a file of the instant invention.

The mobile communication device player 1116 may perform a search on their computing device 1115, for example, which may locate one or more files which may be available for download to their mobile communication device 1115. The mobile communications device player 1116 may then request the map or other file to be downloaded to the mobile communication device 1115 by selecting the patch, download, or individual file, etc. to be downloaded to their device 1115. Once the file has been selected, the game software within the mobile communication device 1115 may construct an upload request file similar to the file described in FIG. 9 and FIG. 10.

In this example, suppose the frame size of the screen on the mobile communication device is only 256×192 and the frame size of the map or other downloadable file is 1024×768. The data store 1108 may, for example, have the frame size of the map or other data. Once the scaling server 1106 receives the request from the mobile communication device 1115 by the player 1116 selecting the file to download and the mobile communication device 1115 building the communication file with the screen size of the target device as 256×192, the file is sent from the mobile communication device 1115 as a request to the scaling server 1106. The scaling server 1106, then receiving the request for the given map or other game file, reads the information in the data store 1108 regarding the requested download file. The scaling server 1106 would read that the map or other requested data frame size is 4 times larger than the target screen size of 256×192. Therefore, the scaling server 1106 would request the map or other game file from the data store 1108, receive the full-scale map or other game data, apply the necessary one or more algorithms to the map or other requested game data to reduce it to fit the 256×192 requested screen size which is found in the request data sent from the mobile communication device 1115. Once the map or other requested data has been reduced to the requested screen size, the reduced map or other game data file is sent from the scaling server 1106 to the requesting mobile communication device 1115. At this point the map or other game data file requested by the player 1116 may be used on the mobile communication device 1115 which received the requested map or other game data file.

Another perspective could include the request for a map or other file which needed to be enlarged to fit the screen size of the target requesting device. The console device player 1112 may perform a search on their computing device 1111, for example, which may locate one or more files which may be available for download to their console device 1111. The console device player 1112 may then request the map or other file to be downloaded to the console device 1111 by selecting the patch, download, or individual file, etc. to be downloaded to the console device 1111. Once the file has been selected, the game software within the console device 1111 may construct an upload request file similar to the file described in FIG. 9 and FIG. 10.

In this example, suppose the frame size of the screen on the console device is 2048×1536 and the frame size of the map or other downloadable file is 1024×768. The data store 1108 may, for example, have the frame size of the map or other data. Once the scaling server 1106 receives the request from the console device 1111 by the player 1112 selecting the file to download and the console device 1111 building the communication file with the screen size of the target device as 2048×1536, the file is sent from the console device 1111 as a request to the scaling server 1106. The scaling server 1106, then receiving the request for the given map or other game file, reads the information in the data store 1108 regarding the requested download file. The scaling server 1106 would read that the map or other requested data frame size is 2 times smaller than the target screen size of 2048×1536. Therefore, the scaling server 1106 would request the map or other game file from the data store 1108, receive the full-scale map or other game data, apply the necessary one or more algorithms to the map or other requested game data to increase the frame size it to fit the 2048×1536 requested screen size which is found in the request data sent from the console device 1111. Once the map or other requested data has been enlarged to the requested screen size, the enlarged map or other game data file is sent from the scaling server 1106 to the requesting console device 1111. At this point the map or other game data file requested by the player 1112 may be used on the console device 1111 which received the requested map or other game data file.

Still another perspective could include the request for a map or other file which did not need to be changed to fit the screen size of the target device. The elements described herein are absent from the FIG. 11 but can be described without the depiction.

The console device player 1112, for example, may perform a search on their computing device 1111, for example, which may locate one or more files which may be available for download to their console device 1111. The console device player 1112 may then request the map or other file to be downloaded to the console device 1111 by selecting the patch, download, or individual file, etc. to be downloaded to the console device 1111. Once the file has been selected, the game software within the console device 1111 may construct an upload request file similar to the file described in FIG. 9 and FIG. 10.

In this example, suppose the frame size of the screen on the console device is 1024×768 and the frame size of the map or other downloadable file is 1024×768. The data store 1108 may, for example, have the frame size of the map or other data. Once the scaling server 1106 receives the request from the console device 1111 by the player 1112 selecting the file to download and the console device 1111 building the communication file with the screen size of the target device as 1024×768, the file is sent from the console device 1111 as a request to the scaling server 1106. The scaling server 1106, then receiving the request for the given map or other game file, reads the information in the data store 1108 regarding the requested download file. The scaling server 1106 would read that the map or other requested data frame size is the same size as the target screen size of 1024×768. Therefore, the scaling server 1106 would request the map or other game file from the data store 1108, receive the full-scale map or other game data, and transmit the requested map or other game data to the console device 1111 without changes. Once the map or other requested data has been delivered from the scaling server 1106 to the requesting console device 1111, the map or other game data file requested by the player 1112 may be used on the console device 1111 which received the requested map or other game data file.

Figure 12:
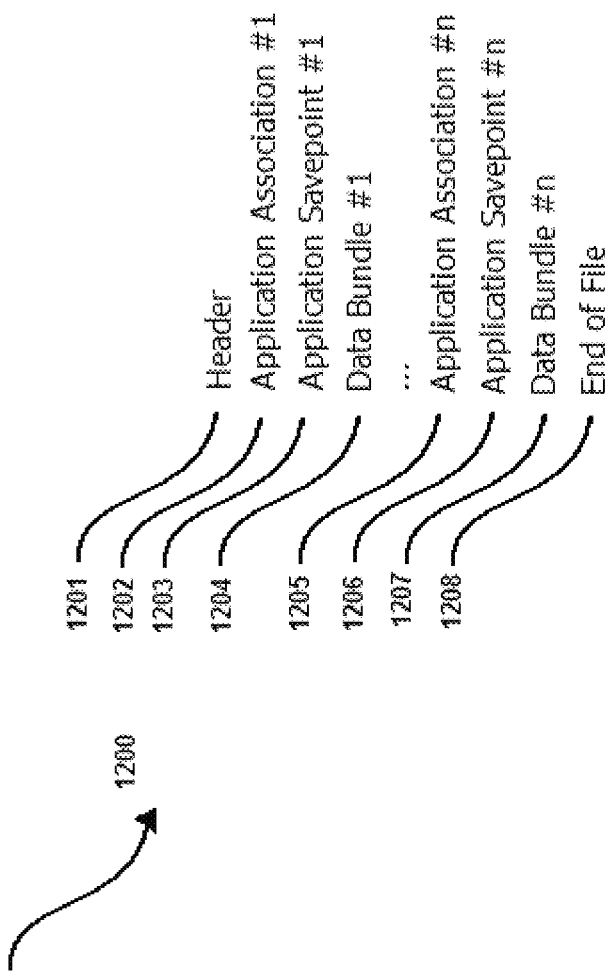
FIG. 12 is a representative file which may be used to transfer from a first system to a second system which contains one or more savepoints.

Referring now to FIG. 12, an example of a file which may be transferred from one system to a receiving system which supports the application association with the data and the point of synchronization, the savepoint 1200 is shown. The file is comprised of a header 1201, at least one application association 1202, an application savepoint 1203 and the data being transferred 1204 and an end of file marker 1208. The file may contain more than one each of the application association 1205, the application savepoint 1207 and the application data 1207. The package being transferred from one device to another device may also be comprised of more than one file.

Figure 13:
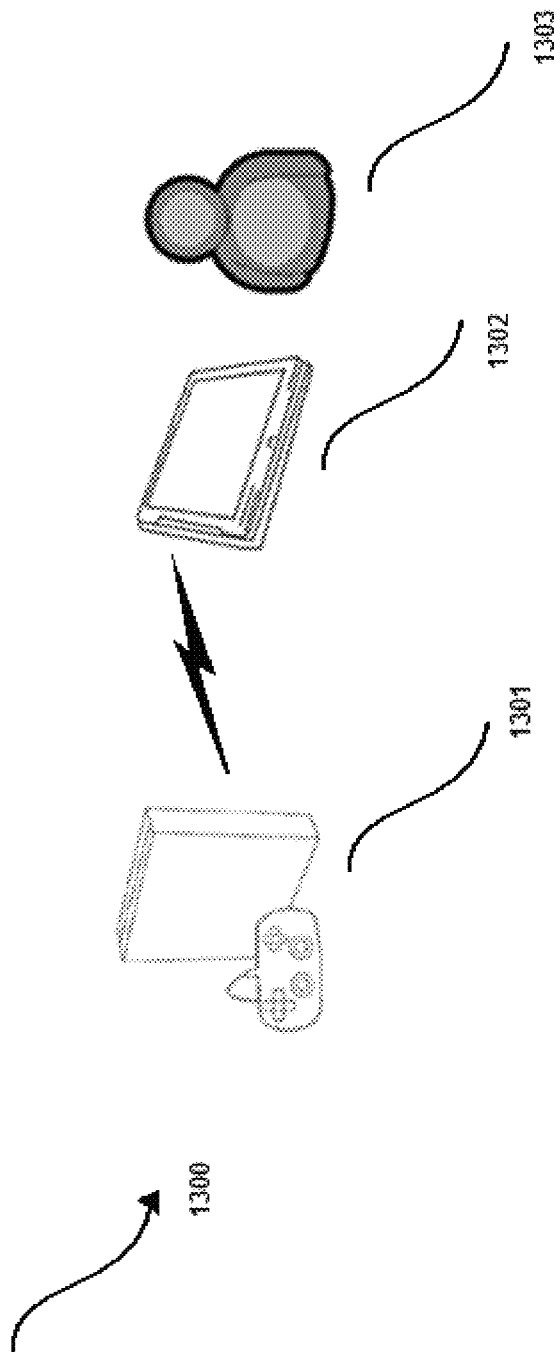
FIG. 13. is a representative communication flow of the instant invention from a mobile game device to a console game device.

Referring now to FIG. 13, the architectural flow of the instant invention 1300 is shown. In this example, the user 1303 is transmitting a game savepoint, further described in FIG. 12, from the console game device 1301 to a mobile game device 1302. Once the transfer has been completed, the user 1303 may begin playing the game from the point they stopped playing the game on the console game device 1301.

Figure 14:
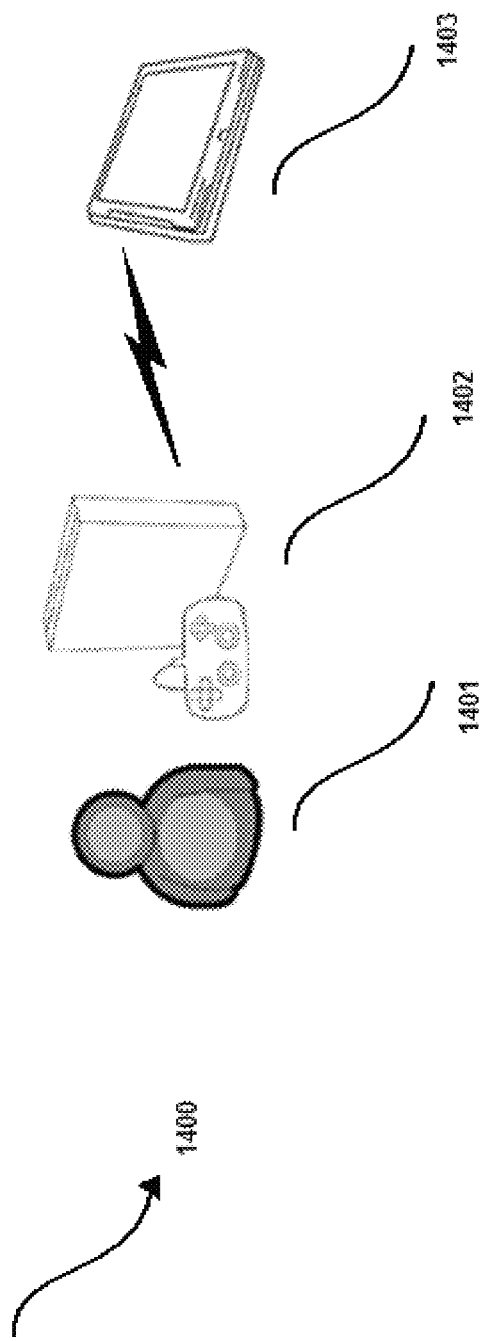
FIG. 14. is a representative communication flow of the instant invention from a console game device to a mobile game device.

Referring now to FIG. 14, the architectural flow of the instant invention 1400 is shown. In this example, the user 1401 is transmitting a game savepoint, further described in FIG. 12, from the mobile game device 1403 to a console game device 1402. Once the transfer has been completed, the user 1401 may begin playing the game from the point they stopped playing the game on the mobile game device 1403.

Figure 15:
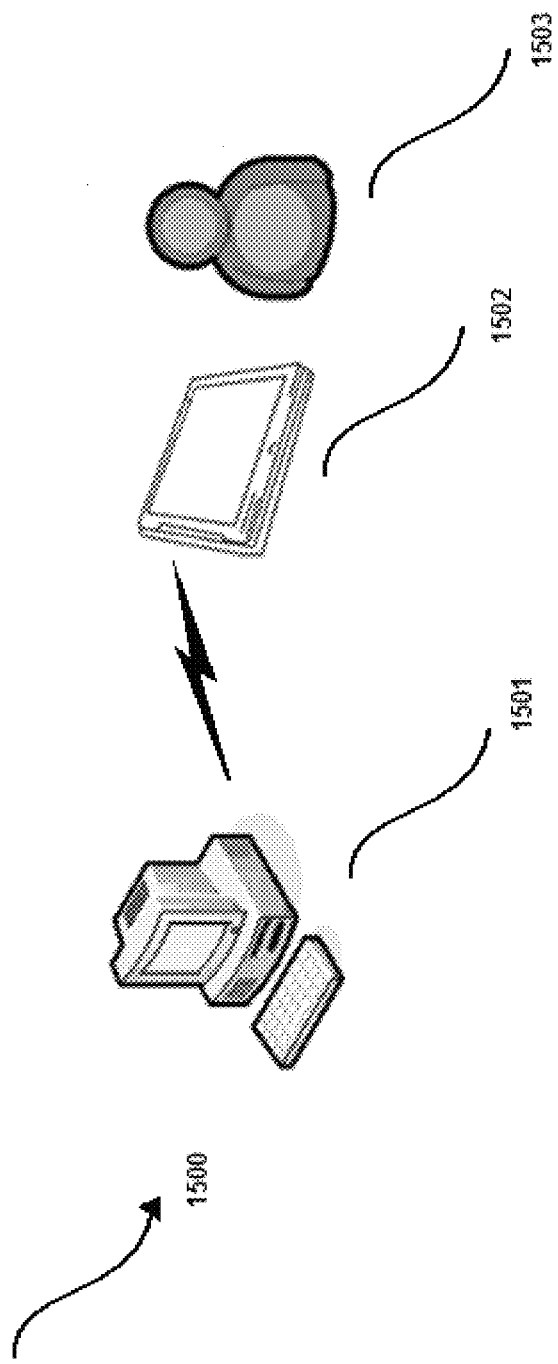
FIG. 15. is a representative communication flow of the instant invention from a mobile electronic device to a desktop computing device.

Referring now to FIG. 15, the architectural flow of the instant invention 1500 is shown. In this example, the user 1503 is transmitting an application savepoint, further described in FIG. 12, from the desktop computing device 1501 to a mobile electronic device 1502. Once the transfer has been completed, the user 1503 may begin working in the application from the point they stopped working on the application 1501.

Figure 16:
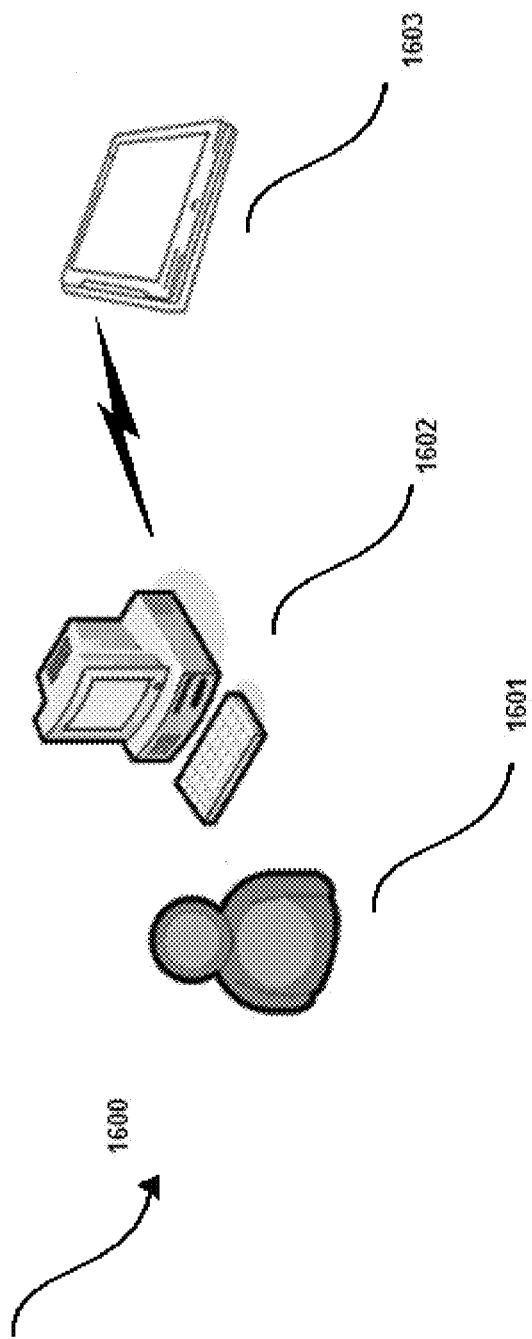
FIG. 16. is a representative communication flow of the instant invention from a desktop computing device to a mobile electronic device.

Referring now to FIG. 16, the architectural flow of the instant invention 1600 is shown. In this example, the user 1601 is transmitting an application savepoint, further described in FIG. 12, from the mobile electronic device 1603 to a desktop computing device 1602. Once the transfer has been completed, the user 1601 may begin working from the point they stopped working on the mobile electronic device 1603.

Finally, the instant invention provides the ability to save and resume, for example, a multi-player game. For instance, if four players are playing as close in proximity as the same room, or as distant as different parts of the world, once the players decide to stop playing, which can be deferred based on a timer or selected through menu items or a controllerless motion, etc., the game system can save the information for each player in one or more files, possibly one file 1200 for each player as described in FIG. 12. The resulting first file 1200 might hold for example, a header 1201 for player one, the game title 1202 for player one, the savepoint 1203 information for player one (which may contain, the player's location in the game map, the health of the player, the rank of the player, the clothing for the player, the items a player may have in their inventory, the number of enemies the player has defeated, the player's score, as well as many other items which are required to restore the player's status in the game), and other game data 1204, 1205, 1206, 1207 and 1208, all of which are not required, which may be needed for the game to resume from the savepoint 1200 (which may include the player's network location, where the game savepoint 1200 is stored, where the game savepoint 1200 is restored to, etc.). Other files 1200 may be written for each corresponding player holding associated information (i.e., 1021, 1202, 1203, 1204, 1205, 1206, 1207 and 1208, all of which are not required) related to the game described. A savepoint file 1200 for one player may be saved to a local drive while another player's savepoint file 1200 may be saved to a remote drive. Savepoint files 1200 may also be saved to one or more other devices, including mobile devices. The savepoint files 1200 can be saved by bookmarks, menu items, etc. where a player may pre-define the location of the savepoint 1200 storage and retrieval or direct it at the time of the save and/or transfer to another device. The savepoints 1200 are stored to a memory and can be further stored to one or more local or remote storage drives. If the one or more savepoint files 1200 are stored to another device, such as a mobile electronic device, the game may be stored, retrieved later and played on the same console machine, another machine in a different location, or played on a mobile electronic device. The players may customize the savepoint file names 1200 by accepting a default name or choosing their own name using an editor. The game can be continued by one or more players and one or more players may drop out of the game. The system may alert one or more players when a player is either scheduled to drop out of the game or they have dropped out. Each player can accept the prompt or notice the prompt and continue playing with having to acknowledge the prompt. The game play can proceed with computer-directed avatars which may represent the players which dropped out or the game play can continue without the missing players' avatars present in the game. The one or more players may return to the same game at the same time, different times, or none at all. If some players previously played in the game without the others, the same players my restore to the savepoints 1200 they achieved or they can revert to the savepoints 1200 previously achieved with the other players, if desired. Once the one or more players decide to return to the game, the game may prompt the players to restore a given savepoint 1200 and may contact the other players associated with the savepoints 1200 by one or more messages to one or more devices they have pre-established to associate with the savepoints 1200 such as mobile electronic device, console game system, email or some other electronic or voice prompt. They also may be prompted where the savepoint 1200 is located as well as reading a previously indicated savepoint 1200 storage location. If the savepoint 1200 is successfully read into the system, the data needed to restore the player to their correct score, level, inventory, clothing, options, tools, money, etc. are read into a memory from the one of more savepoint 1200 files. Once the savepoint 1200 information is retrieved from memory into the game software, the game software can open a game level and location on the game map for each corresponding player which joined the savepoints 1200 and game play can resume from the savepoint 1200 associated with each player. In addition, any missing or new players may join or drop out of the game play at any time.

In the case that the data being transferred from one machine of a particular architecture to another machine of a different architecture, the binary encoding of the data being transferred may require a transformation from one bit orientation to another. For example, when transferring a game data from a big endian-based architecture to a little endian-based architecture, the binary encoding requires a network-to-host byte order.

short big=big_byte;
short little=(((big & 0xff)<<8)|((big & 0xff00)>>8));

It should be understood that the foregoing description is only illustrative of the instant invention. Various alternatives and modifications can be devised by those skilled in the art without departing from the claims of the instant invention including, but not limited to, the use of one computing device over another, including mobile devices, or one computing device over many computing devices, etc. Accordingly, the present invention is intended to embrace all such alternatives, modifications and variances which fall within the scope of the appended claims.

What is claimed is:

1. A method of establishing and sharing an application savepoint for a plurality of computing devices, the method comprising:
  establishing a savepoint of an active application currently operating on a first computing device, the savepoint corresponding to a specific progress state of the active application;
  identifying at least one other computing device to receive the savepoint;
  modifying values in the savepoint to adjust graphics according to the at least one other computing device;
  transmitting the savepoint to the at least one other computing device;
  launching the application on the at least one other computing device and associating the savepoint with the application; and
  resuming the same specific progress state on the at least one other computing device, wherein
  the modifying of the values comprises reading target map settings in a map request made by the at least one other computing device and re-sampling the requested map based on the target map settings.

2. The method of claim 1, further comprising:
    transmitting at least one file from the first computing device to the at least one other computing device, wherein the at least one file comprises a header, the savepoint, an application association and an end of file marker.

3. The method of claim 1, wherein the application is an electronic game and the savepoint corresponds to a specific point in time when the electronic game was saved and the savepoint was stored in memory.

4. The method of claim 3, wherein resuming the same specific progress state comprises accessing and resuming the electronic game on the second electronic device at the savepoint saved on the first electronic device.

5. The method of claim 3, further comprising:
    storing the savepoint in at least one file comprising player progress of a plurality of players participating in the electronic game, and player information of each of the plurality of players.

6. The method of claim 5, wherein the player information comprises at least one of player name, player score, player status, and player objects used in the electronic game.

7. The method of claim 5, further comprising:
    retrieving the savepoint; and
    launching the application to allow the plurality of players to resume playing the electronic game based on the savepoint information for each of the plurality of players.

8. An apparatus computing device configured to establish and share an application savepoint for a plurality of computing devices, the apparatus comprising:
    a processor configured to
        establish a savepoint of an active application currently operating, the savepoint corresponding to a specific progress state of the active application,
        identify at least one other computing device to receive the savepoint, and
        modify values in the savepoint to adjust graphics according to the at least one other computing device, wherein the modifying of the values comprises reading target map settings in a map request made by the at least one other computing device and re-sampling the request map based on the target map settings; and
    a transmitter configured to transmit the savepoint to the at least one other computing device, which launches the application and associates the savepoint with the application, and resumes the same specific progress state on the at least one other computing device.

9. The apparatus of claim 8, wherein the transmitter is further configured to transmit at least one file from the first computing device to the at least one other computing device, wherein the at least one file comprises a header, the savepoint, an application association and an end of file marker.

10. The apparatus of claim 8, wherein the application is an electronic game and the savepoint corresponds to a specific point in time when the electronic game was saved and the savepoint was stored in memory.

11. The apparatus of claim 8, wherein to resume the same specific progress state comprises accessing and resuming the electronic game on the second electronic device according to the stored savepoint.

12. The apparatus of claim 10, wherein the processor is further configured to store the savepoint in at least one file comprising player progress of a plurality of players participating in the electronic game, and player information of each of the plurality of players.

13. The apparatus of claim 12, wherein the player information comprises at least one of player name, player score, player status, and player objects used in the electronic game.

14. The apparatus of claim 12, wherein the processor is further configured to retrieve the savepoint, and invoke the plurality of players to resume playing the electronic game based on the savepoint information for each of the plurality of players.

15. A non-transitory computer readable storage medium configured to store instructions that when executed cause a processor to establish and share an application savepoint for a plurality of computing devices, the processor being further configured to perform:
    establishing a savepoint of an active application currently operating on a first computing device, the savepoint corresponding to a specific progress state of the active application;
    identifying at least one other computing device to receive the savepoint;
    modifying values in the savepoint to adjust graphics according to the at least one other computing device;
    transmitting the savepoint to the at least one other computing device;
    launching the application on the at least one other computing device and associating the savepoint with the application; and
    resuming the same specific progress state on the at least one other computing device, wherein
    the modifying of the values comprises reading target map settings in a map request made by the at least one other computing device and re-sampling the requested map based on the target map settings.

16. The non-transitory computer readable storage medium of claim 15, further comprising:
    transmitting at least one file from the first computing device to the at least one other computing device, wherein the at least one file comprises a header, the savepoint, an application association and an end of file marker.

17. The non-transitory computer readable storage medium of claim 15, wherein the application is an electronic game and the savepoint corresponds to a specific point in time when the electronic game was saved and the savepoint was stored in memory.

18. The non-transitory computer readable storage medium of claim 17, wherein resuming the same specific progress state comprises accessing and resuming the electronic game on the second electronic device at the savepoint saved on the first electronic device.

19. The non-transitory computer readable storage medium of claim 17, wherein the processor is further configured to perform:
    storing the savepoint in at least one file comprising player progress of a plurality of players participating in the electronic game, and player information of each of the plurality of players.

20. The non-transitory computer readable storage medium of claim 19, wherein
    the player information comprises at least one of player name, player score, player status, and player objects used in the electronic game, and wherein
    the processor is further configured to perform retrieving the savepoint, and launch the application to allow the plurality of players to resume playing the electronic game based on the savepoint information for each of the plurality of players.

* * * * *